United States Patent
Abuelsaad et al.

(10) Patent No.: US 9,463,875 B2
(45) Date of Patent: Oct. 11, 2016

(54) UNMANNED AERIAL VEHICLE FOR HAZARD DETECTION

(71) Applicant: International Business Machines Corporation, Armonk, NY (US)

(72) Inventors: Kelly Abuelsaad, Somers, NY (US); Gregory J. Boss, Saginaw, MI (US); Kevin C. McConnell, Austin, TX (US); Shane B. McElligott, Apex, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/476,228

(22) Filed: Sep. 3, 2014

(65) Prior Publication Data

US 2016/0059962 A1   Mar. 3, 2016

(51) Int. Cl.

| G01C 23/00 | (2006.01) |
|---|---|
| G05D 1/00 | (2006.01) |
| G05D 3/00 | (2006.01) |
| G06F 7/00 | (2006.01) |
| G06F 17/00 | (2006.01) |
| B64C 39/02 | (2006.01) |

(52) U.S. Cl.
CPC ....... B64C 39/024 (2013.01); *B64C 2201/123* (2013.01); *B64C 2201/127* (2013.01); *B64C 2201/14* (2013.01)

(58) Field of Classification Search
USPC .......... 701/3, 24, 117, 120, 122, 408, 409, 701/412, 431, 416; 244/190, 189, 175, 76 R, 244/75.1; 455/456.1; 348/117; 345/419
See application file for complete search history.

(56) References Cited

U.S. PATENT DOCUMENTS

| 5,728,965 A | 3/1998 | Fesland et al. |
| 8,026,833 B2 | 9/2011 | Villaume et al. |
| 9,056,676 B1* | 6/2015 | Wang .................. B64C 39/024 |
| 2010/0273504 A1* | 10/2010 | Bull ......................... G01S 5/02 455/456.1 |
| 2011/0130636 A1* | 6/2011 | Daniel ................. G08B 25/016 600/301 |
| 2012/0050524 A1* | 3/2012 | Rinner .................. G06T 7/0028 348/117 |
| 2012/0050525 A1* | 3/2012 | Rinner .................. G06T 7/0028 348/117 |
| 2012/0091259 A1* | 4/2012 | Morris .................... B64C 27/02 244/17.13 |
| 2013/0041508 A1 | 2/2013 | Hu et al. |
| 2013/0200207 A1 | 8/2013 | Pongratz et al. |
| 2013/0325325 A1 | 12/2013 | Djugash |
| 2014/0015973 A1 | 1/2014 | Vasquez et al. |
| 2014/0166816 A1* | 6/2014 | Levien ................. B64C 39/024 244/175 |
| 2015/0140954 A1* | 5/2015 | Maier ..................... H04W 4/22 455/404.2 |

FOREIGN PATENT DOCUMENTS

| CN | 102607592 A | 7/2012 |
| WO | 2008085536 A2 | 7/2008 |

OTHER PUBLICATIONS

"Car 2 Car Communication Consortium, Technical Approach", downloaded Jun. 17, 2014, <http://www.car-to-car.org/index.php?id=8&L=0>.
"Safespot Integrated Project", Sep. 2009, <http://www.safespot-eu.org/>.

* cited by examiner

*Primary Examiner* — Ronnie Mancho
(74) *Attorney, Agent, or Firm* — Maeve M. Carpenter

(57) ABSTRACT

In an approach to hazard detection, one or more computer processors determine whether an obstruction of view for a user in a first vehicle is detected. Responsive to determining the obstruction is detected, the one or more computer processors deploy a first unmanned aerial vehicle (UAV) associated with the first vehicle. The one or more computer processors determine whether one or more hazards associated with a path of the first vehicle are detected.

17 Claims, 3 Drawing Sheets

UNMANNED AERIAL VEHICLE FOR HAZARD DETECTION

BACKGROUND OF THE INVENTION

The present invention relates generally to the field of unmanned aerial vehicles, and more particularly to hazard detection using unmanned aerial vehicles.

An unmanned aerial vehicle (UAV), commonly known as a drone, is an aircraft without a human pilot aboard. Flight of the UAV is controlled either autonomously by onboard computers or by a remote control operated by a pilot on the ground or in another vehicle. The typical launch and recovery method of an unmanned aircraft is by the function of an automatic system or an external operator on the ground.

A motor vehicle collision, also known as a traffic accident, traffic collision, motor vehicle accident, car accident, automobile accident, road traffic collision, road traffic accident, or wreck occurs when a vehicle collides with another vehicle, pedestrian, animal, road debris, or other stationary obstruction, such as a tree or utility pole. Motor vehicle collisions may result in injury, death, vehicle damage, and property damage. A number of factors contribute to the risk of collision, including vehicle design, speed of operation, road design, road environment, driver skill and/or impairment, and driver behavior. Worldwide, motor vehicle collisions lead to death and disability as well as financial costs to both society and the individuals involved.

SUMMARY

Embodiments of the present invention disclose a method, a computer program product, and a system for hazard detection. The method for hazard detection may include one or more computer processors determining whether an obstruction of view for a user in a first vehicle is detected. Responsive to determining the obstruction is detected, the one or more computer processors deploy a first unmanned aerial vehicle (UAV) associated with the first vehicle. The one or more computer processors determine whether one or more hazards associated with a path of the first vehicle are detected.

DETAILED DESCRIPTION

Global positioning systems (GPS) are often updated with traffic information after an accident is reported to the authorities. The traffic update can take a significant amount of time to get to a driver in the vicinity of an incident. A driver in the vicinity of the incident may not be alerted of the hazard with sufficient time to attempt to avoid the hazard. Other traffic monitoring systems exist that depend on drivers logging observed conditions or on specific road infrastructure that monitors road conditions.

Embodiments of the present invention recognize that systems to warn a driver of impending roadway hazards can be improved with the use of an unmanned aerial vehicle (UAV) that monitors road conditions ahead of a vehicle where the driver's view may be obstructed. Implementation of embodiments of the invention may take a variety of forms, and exemplary implementation details are discussed subsequently with reference to the Figures.

Figure 1:
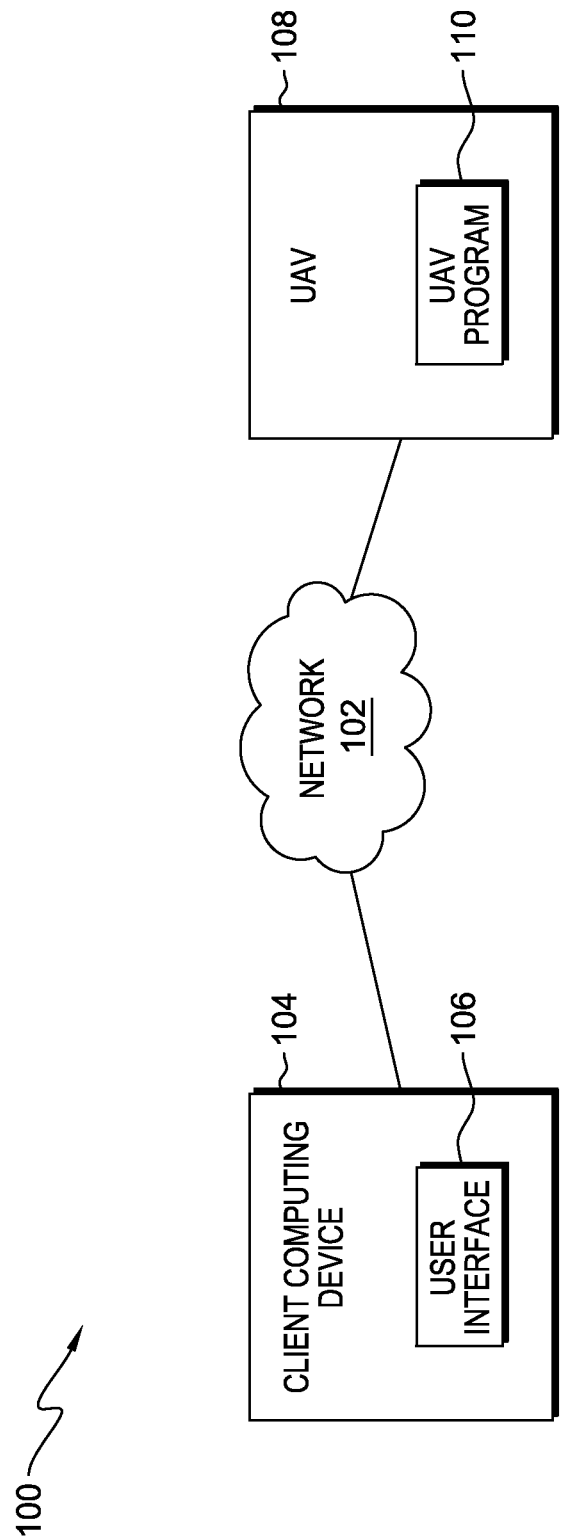
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing device 104 and UAV 108 interconnected over network 102. Network 102 can be, for example, a telecommunications network, a local area network (LAN), a wide area network (WAN), such as the Internet, or a combination of the three, and can include wired, wireless, or fiber optic connections. Network 102 may include one or more wired and/or wireless networks that are capable of receiving and transmitting data, voice, and/or video signals, including multimedia signals that include voice, data, and video information.

Client computing device 104 may be a desktop computer, a laptop computer, a tablet computer, a specialized computer server, a smart phone, or any programmable electronic device capable of communicating with UAV 108 via network 102 and with various components and devices within distributed data processing environment 100. Client computing device 104 may be integrated into a user's vehicle. Client computing device 104 may be a wearable computer. Wearable computers are miniature electronic devices that may be worn by the bearer under, with or on top of clothing, as well as in glasses, hats, or other accessories. Wearable computers are especially useful for applications that require more complex computational support than just hardware coded logics. In general, client computing device 104 represents any programmable electronic device or combination of programmable electronic devices capable of executing machine readable program instructions and communicating with other computing devices via a network, such as network 102. Client computing device 104 includes user interface 106.

User interface 106 provides an interface between a user of client computing device 104 and UAV 108. User interface 106 may be a graphical user interface (GUI) or a web user interface (WUI) and can display text, documents, web browser windows, user options, application interfaces, and instructions for operation, and includes the information (such as graphic, text, and sound) a program presents to a user and the control sequences the user employs to control the program. User interface 106 may also be mobile application software that provides an interface between a user of client computing device 104 and UAV 108. Mobile application software, or an "app", is a computer program designed to run on smart phones, tablet computers and other mobile devices. User interface 106 enables a user of client computing device 104 to receive warnings of hazards from UAV 108.

UAV 108 is an unmanned aerial vehicle that can be deployed to monitor the road ahead of a user of client computing device 104. In one embodiment, UAV 108 is mounted on a user's vehicle. In another embodiment, a third party may dispatch UAV 108 to lead a user. UAV 108 may take one of a plurality of forms, for example, an airplane, a helicopter, or a projectile. UAV 108 includes the capability of any programmable electronic device or combination of programmable electronic devices capable of executing machine readable program instructions and communicating with other computing devices via a network, such as network 102. In one embodiment, UAV 108 also includes a plurality of sensors used to monitor road conditions, for example, cameras, radar, infrared, etc. In another embodiment, one or more of the sensors are integrated into the vehicle for which UAV 108 is deployed. In one embodiment, UAV 108 is one of many UAVs that may constitute a fleet, or network, of UAVs in distributed data processing environment 100 (not shown). UAV 108 includes UAV program 110. In some embodiments, UAV 108 also includes systems for communication, for example, Bluetooth, and navigation, for example, GPS, as well as additional mapping and object recognition systems (not shown).

UAV program 110 monitors road conditions and notifies the user of impending danger or hazards. UAV program 110 determines if a user's view of the road is obstructed. If the user's view is obstructed, UAV program 110 deploys UAV 108 to monitor the road for any impending hazards or danger. If UAV program 110 detects any hazards, UAV program 110 notifies the user so that the user can attempt to avoid the hazard. In one embodiment, UAV program 110 resides on UAV 108. In another embodiment, UAV program 110 may reside on a server computer within distributed data processing environment 100 (not shown), provided that the server computer can communicate with client computing device 104 and UAV 108 via network 102. UAV program 110 is depicted and described in further detail with respect to FIG. 2.

Figure 2:
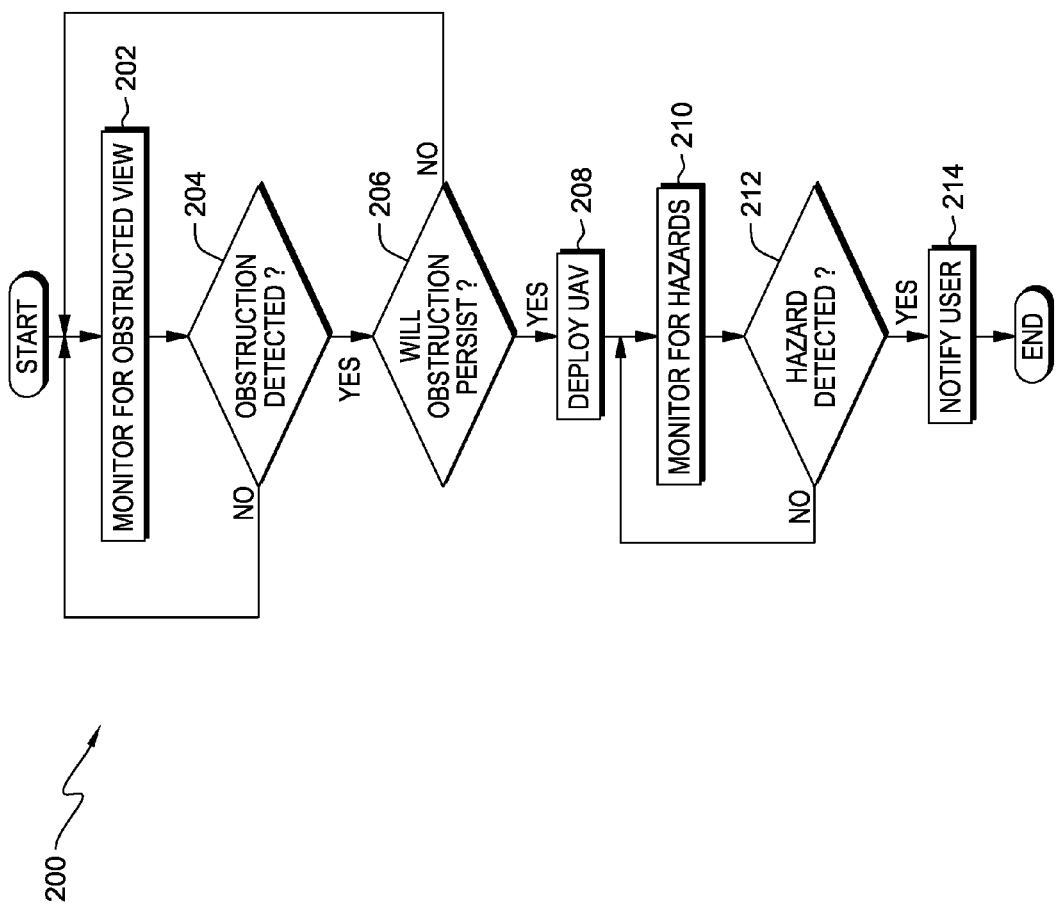
FIG. 2 is a flowchart depicting operational steps of a UAV program, on a computing device within the distributed data processing environment of FIG. 1, for hazard detection and notification, in accordance with an embodiment of the present invention.

FIG. 2 is flowchart 200 depicting operational steps of UAV program 110 on a computing device, for example, UAV 108, within distributed data processing environment 100 of FIG. 1, for hazard detection and notification, in accordance with an embodiment of the present invention.

UAV program 110 monitors for obstructed view (step 202). Using sensors integrated into UAV 108 or the vehicle for which UAV 108 is deployed, or both, UAV program 110 monitors the user's view of the road to determine whether the view is obstructed, thus preventing the user from seeing a hazard up ahead. For example, a large vehicle that moves in front of the user's vehicle may obstruct the user's view. In another example, fog or other inclement weather conditions may obstruct the user's view. In one embodiment, UAV program 110 may monitor for obstructed view by receiving road hazard alerts by known methods. In another embodiment, UAV program 110 may monitor for obstructed view by retrieving weather information that, for example, may provide an alert to an impending storm. In a further embodiment, UAV program 110 may monitor for obstructed view by retrieving information on road construction upcoming in the path of the vehicle for which UAV 108 is deployed. In one embodiment, UAV program 110 is a feature of the vehicle on which UAV 108 is mounted, and is always on. In another embodiment, UAV program 110 may default to being off until the user chooses to turn on UAV program 110.

UAV program 110 determines whether an obstruction is detected (decision block 204). UAV program 110 detects obstructions using sensors integrated in UAV 108 or in the vehicle for which UAV 108 is deployed, or by retrieving data from third party sources. If an obstruction is not detected ("no" branch, decision block 204), then UAV program 110 continues to monitor for obstructed view (step 202). If an obstruction is detected ("yes" branch, decision block 204), then UAV program 110 determines whether the obstruction will persist (decision block 206). Depending on the detected conditions, UAV program 110 determines whether the obstruction will dissipate within a pre-defined threshold of time. For example, if the user is on a multi-lane highway, and a large vehicle pulls in front of the user's vehicle, UAV program 110 determines the large vehicle will move again shortly by detecting a continuous turn signal on the large vehicle and noting, via GPS, that an exit ramp is coming up in a short distance. In another example, UAV program 110 may detect a foggy area, and, based on the upcoming terrain, known from uploaded topological maps or GPS, determine that the fog is likely to persist for several minutes. If UAV program 110 determines that the obstruction will not persist ("no" branch, decision block 206), then UAV program 110 continues monitoring for obstructed view (step 202).

If UAV program 110 determines that the obstruction will persist ("yes" branch, decision block 206), then UAV program 110 deploys UAV 108 (step 208). Responsive to determining that an obstruction will persist, UAV program 110 determines when and for how long to deploy UAV 108. UAV program 110 determines when to deploy UAV 108 based on monitored conditions, policy, and user definitions. For example, a local government may have policies to restrict the use of UAVs, such as prohibiting the use of UAVs from sunset to sunrise, or allowing only a particular number of UAVs to fly in a specified area at one time. In another example, a user may define that UAV program 110 deploys UAV 108 when the user cannot see a distance of 0.25 miles ahead. UAV program 110 accounts for the capabilities of UAV 108, including battery life, flight time capability, launch time restraints, etc. in determining when and for how long to deploy UAV 108. For example, if UAV 108 is a helicopter form factor, then the flight time capability may be longer than if UAV 108 is a projectile form factor, since a projectile may only be in the air for a few seconds. UAV program 110 uses GPS and mapping capabilities to determine how far ahead of the user potential hazards may occur and at what height to deploy UAV 108 in order to achieve aerial views of the target location. For example, UAV program 110 may calculate, based on GPS coordinates and topological maps, as well as a target distance to maintain in front of the vehicle, the height UAV 108 has to be for a line of sight view of the road ahead. UAV program 110 may re-calculate the height in regular intervals of either time or distance. In one embodiment, UAV program 110 deploys UAV 108 by launching UAV 108 from the vehicle on which UAV 108 is mounted. The method of launch may depend on the design of UAV 108. In an embodiment where the user's vehicle does not include a vehicular mounted UAV, UAV program 110 may receive a request from the user to deploy a third party UAV. The user may request the third party UAV via the vehicle's onboard computing system using voice commands, touchscreen gestures, or a push button. UAV program 110 locates a third party UAV nearby and provides the location of the requester to the third party UAV by broadcasting GPS coordinates. For example, a public agency may provide a public UAV near a section of roadway that is particularly dangerous. A user may request assistance, via user interface 106, from the public UAV. In an embodiment, the user can choose to manually deploy UAV 108 in anticipation of upcoming hazards even if UAV program 110 determines that an obstruction will not persist.

UAV program 110 monitors for hazards (step 210). UAV program 110 directs UAV 108 to fly ahead of the user's vehicle to monitor for conditions that may be hazardous or dangerous. During the monitoring, UAV program 110 collects measurements about how far ahead a hazard is or for how long a hazard will persist. Hazards may include debris on the road, traffic jams, traffic accidents, the presence of police or emergency vehicles, and weather related road conditions, such as flooding, snow, fog, hydroplaning conditions, etc. For example, UAV program 110 may determine a traffic jam is up ahead by calculating the average distance between vehicles and the speed at which the vehicles travel and comparing the speed to the known speed limit for the road. UAV program 110 may direct UAV 108 to fly a certain distance ahead of the user's vehicle. The distance may depend on the type of vehicle. For example, a small sedan can stop faster than a tractor trailer due to the weight of the vehicle, therefore the amount of warning time needed differs. The amount of warning time needed can dictate the distance between UAV 108 and the vehicle from which it is deployed. The distance may also depend on the road on which the vehicle travels. For example, a straight, flat road has fewer obstructions than a curvy, hilly road, therefore the distance UAV 108 flies ahead of the vehicle may be larger on the curvy, hilly road to allow for sufficient warning time. The distance may also be user defined. In an embodiment, UAV program 110 may direct UAV 108 to speed up and travel further ahead of the vehicle than the pre-defined distance. For example, if UAV program 110 determines an upcoming curve in the road, either by viewing via a camera or by using GPS information, UAV program 110 may send UAV 108 further up ahead of the vehicle to monitor for hazards that cannot be seen around the curve. UAV program 110 monitors for obstacles in the user's immediate path, for example, a large tree branch in the road. UAV program 110 monitors for obstacles to the flow of oncoming traffic, for example, a large tree branch in the lane of oncoming traffic which may cause other drivers to swerve into the user's lane. UAV program 110 monitors for potential hazards on the sides of the road, for example a deer grazing on one side of the road. In an embodiment where UAV program 110 resides on a server computer, separate from UAV 108, UAV 108 communicates potential hazards and obstructions, captured, for example, using a camera or radar, to UAV program 110 via network 102.

UAV program 110 determines whether a hazard is detected (decision block 212). If UAV program 110 determines that a hazard is not detected ("no" branch, decision block 212), then UAV program 110 continues to monitor for hazards (step 210). If UAV program 110 determines a hazard is detected ("yes" branch, decision block 212), then UAV program 110 notifies the user (step 214). In one embodiment, UAV program 110 notifies the user by sending wireless notification via the vehicle's onboard computing system using audio and/or visual cues on the dashboard or a display. In another embodiment, UAV program 110 may notify the user by sending a message to the user's smart phone. The notification may include in what distance the user will encounter the hazard. The notification may also include the amount of time, based on the vehicle's current speed, until the user encounters the hazard. The notification may include information regarding the severity of the hazard. For example, the severity can differ between a road that is completely blocked and a deer grazing by the side of the road. The notification may include advisory information regarding how the user should respond to the upcoming hazard. For example, if the vehicle's current lane is blocked, the notification may indicate to the user to change lanes. In another example, if there are deer by the side of the road, the notification may indicate to the user to slow down and use caution. The notification may also include information regarding an alternate route to avoid the hazard. For example, if UAV program 110 detects a traffic bottleneck where cars are at a standstill, then UAV program 110 may notify the user of the location of the bottleneck and suggest an alternate route using audio or visual cues via an integrated dashboard display, GPS device, or smart phone.

In one embodiment, UAV program 110 may notify the user by interacting with the vehicle's safety system. For example, if UAV program 110 determines the hazard is close enough to the vehicle that the user does not have adequate time to react to a warning, UAV program 110 may communicate with the vehicle's computing system to activate the vehicle's brakes and slow the vehicle down. In another embodiment, UAV program 110 may notify a user in a vehicle that is not associated with UAV 108. For example, if user interface 106 is a mobile app that a user can download to a smart phone, the user may receive notifications from a UAV in the vicinity on the user's smart phone. If UAV program 110 detects a hazard using UAV 108, UAV program 110 can alert users of user interface 106 in the vicinity of the vehicle from which UAV 108 is deployed.

In a further embodiment, UAV program 110 may communicate with other UAVs to create a network of UAVs that can give an expanded view of potential hazards. For example, a user may define a geofence around the user's vehicle of a particular radius, such as two miles. UAV program 110 establishes communication with other UAVs in the two mile radius and monitors for hazards using UAV 108 in addition to the other UAVs in the two mile radius. If UAV program 110 detects a hazard via UAV 108, UAV program 110 notifies the users of the other UAVs in the network. When another UAV in the network detects a hazard, UAV program 110 receives communication from the detecting UAV. The UAVs in the network may be deployed serially or in parallel.

Figure 3:
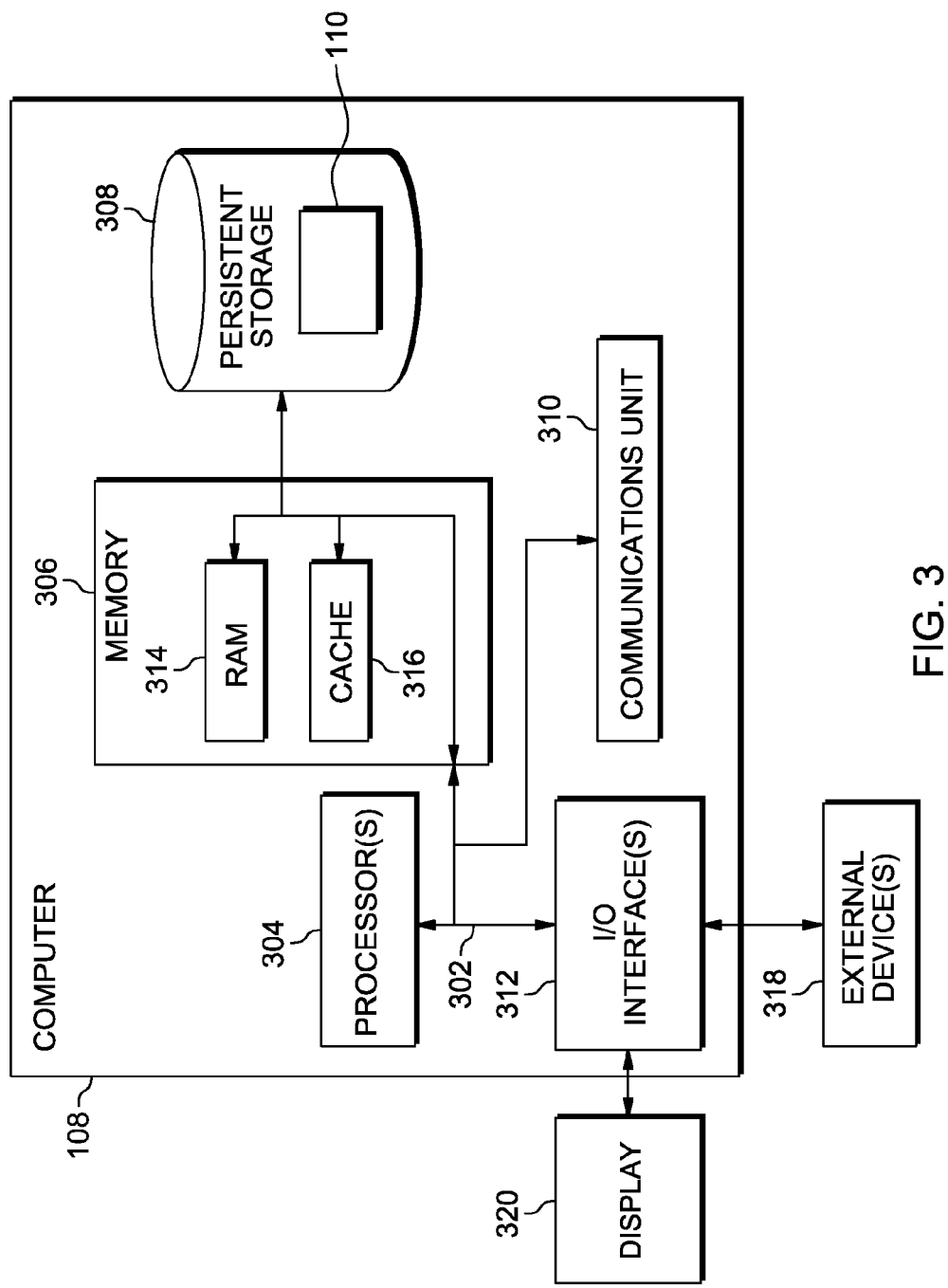
FIG. 3 depicts a block diagram of components of the computing device, for example, a UAV, executing the UAV program, in accordance with an embodiment of the present invention.

FIG. 3 depicts a block diagram of components of a computing device, for example, UAV 108, executing UAV program 110, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

UAV 108 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 314 and cache memory 316. In general, memory 306 can include any suitable volatile or non-volatile computer readable storage media.

UAV program 110 is stored in persistent storage 308 for execution by one or more of the respective computer processor(s) 304 via one or more memories of memory 306. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of client computing device 104. In these examples, communications unit 310 includes one or more network interface cards. Communications unit 310 may provide communications through the use of either or both physical and wireless communications links. UAV program 110 may be downloaded to persistent storage 308 through communications unit 310.

I/O interface(s) 312 allows for input and output of data with other devices that may be connected to UAV 108. For example, I/O interface(s) 312 may provide a connection to external device(s) 318 such as a keyboard, a keypad, a touch screen, a microphone, a digital camera, and/or some other suitable input device. External device(s) 318 can also include portable computer readable storage media such as, for example, thumb drives, portable optical or magnetic disks, and memory cards. Software and data used to practice embodiments of the present invention, e.g., UAV program 110, can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for hazard detection, the method comprising:
   monitoring, by one or more computer processors, for a first vehicle user's obstructed view of a road;
   detecting, by the one or more computer processors, the first vehicle user's obstructed view;
   responsive to detecting the first vehicle user's obstructed view, determining, by the one or more computer processors, whether the obstructed view will persist for a pre-defined threshold of time;
   responsive to determining the obstructed view will persist for a pre-defined threshold of time, deploying, by the one or more computer processors, a first unmanned aerial vehicle (UAV) associated with the first vehicle; and
   determining, by the one more computer processors, whether one or more hazards associated with a path of the first vehicle are detected.

2. The method of claim 1, wherein one or more hazards associated with the path of the first vehicle includes at least: a debris on a road, a traffic jam, a traffic accident, a presence of an emergency vehicle, and a weather related road condition.

3. The method of claim 1, further comprising, responsive to determining one or more hazards associated with the path of the first vehicle are detected, notifying, by the one or more computer processors, the user of the one or more hazards, wherein notifying includes sending, by the one or more computer processors, an audio or visual cue.

4. The method of claim 3, wherein notifying the user of the one or more hazards includes advisory information regarding how the user should respond for the user to avoid the one or more hazards.

5. The method of claim 3, wherein notifying the user of the one or more hazards further comprises interacting, by the one or more computer processors, with a safety system of the vehicle.

6. The method of claim 1, wherein the first vehicle user's obstructed view is a condition that prevents the user from viewing one or more hazards associated with the path of the first vehicle.

7. The method of claim 1, wherein monitoring includes utilizing, by the one or more computer processors, a plurality of sensors, wherein the plurality of sensors includes at least: a camera, a radar, and infrared.

8. The method of claim 1, further comprising notifying, by the one or more computer processors, a user of a second vehicle of the one or more hazards.

9. The method of claim 1, further comprising:
   detecting, by the one or more computer processors, one or more additional deployed unmanned aerial vehicles in a pre-defined radius; and
   communicating, by the one or more computer processors, with the one or more additional deployed unmanned aerial vehicles to monitor for one or more hazards associated with a path of the first vehicle.

10. A computer program product for hazard detection, the computer program product comprising:
   one or more computer readable storage media and program instructions stored on the one or more computer readable storage media, the program instructions comprising:
   program instructions to monitor for a first vehicle user's obstructed view of a road;
   program instructions to detect the first vehicle user's obstructed view;
   responsive to detecting the first vehicle user's obstructed view, program instructions to determine whether the obstructed view will persist for a pre-defined threshold of time;
   responsive to determining the obstructed view will persist for a pre-defined threshold of time, program instructions to deploy a first unmanned aerial vehicle (UAV) associated with the first vehicle; and program instructions to determine whether one or more hazards associated with a path of the first vehicle are detected.

11. The computer program product of claim 10, further comprising, responsive to determining one or more hazards associated with the path of the first vehicle are detected, program instructions to notify the user of the one or more hazards, wherein program instructions to notify includes program instructions to send an audio or visual cue.

12. The computer program product of claim 10, further comprising program instructions to notify a user of a second vehicle of the one or more hazards.

13. The computer program product of claim 10, further comprising:
program instructions to detect one or more additional deployed unmanned aerial vehicles in a pre-defined radius; and
program instructions to communicate with the one or more additional deployed unmanned aerial vehicles to monitor for one or more hazards associated with a path of the first vehicle.

14. A computer system for hazard detection, the computer system comprising:
one or more computer processors;
one or more computer readable storage media;
program instructions stored on the computer readable storage media for execution by at least one of the one or more processors, the program instructions comprising:
program instructions to monitor for a first vehicle user's obstructed view of a road;
program instructions to detect the first vehicle user's obstructed view;
responsive to detecting the first vehicle user's obstructed view, program instructions to determine whether the obstructed view will persist for a pre-defined threshold of time;
responsive to determining the obstructed view will persist for a pre-defined threshold of time, program instructions to deploy a first unmanned aerial vehicle (UAV) associated with the first vehicle; and
program instructions to determine whether one or more hazards associated with a path of the first vehicle are detected.

15. The computer system of claim 14, further comprising, responsive to determining one or more hazards associated with the path of the first vehicle are detected, program instructions to notify the user of the one or more hazards, wherein program instructions to notify includes program instructions to send an audio or visual cue.

16. The computer system of claim 14, further comprising program instructions to notify a user of a second vehicle of the one or more hazards.

17. The computer system of claim 14, further comprising:
program instructions to detect one or more additional deployed unmanned aerial vehicles in a pre-defined radius; and
program instructions to communicate with the one or more additional deployed unmanned aerial vehicles to monitor for one or more hazards associated with a path of the first vehicle.

* * * * *